No. 683,270. Patented Sept. 24, 1901.
R. H. GEIGER.
FENCE POST.
(Application filed Nov. 25, 1898.)

(No Model.)

Witnesses:

Inventor:
Richard H. Geiger
By Kay & Totten
Attorneys.

UNITED STATES PATENT OFFICE.

RICHARD H. GEIGER, OF PITTSBURG, PENNSYLVANIA.

FENCE-POST.

SPECIFICATION forming part of Letters Patent No. 683,270, dated September 24, 1901.

Application filed November 25, 1898. Serial No. 697,353. (No model.)

*To all whom it may concern:*

Be it known that I, RICHARD H. GEIGER, a resident of Pittsburg, in the county of Allegheny and State of Pennsylvania, have invented a new and useful Improvement in Fence-Posts; and I do hereby declare the following to be a full, clear, and exact description thereof.

My invention relates to fence-posts, its object being to provide a cheap and durable fence-post which will not be liable to rot in the ground and which will have sufficient bulk of base to take a firm hold upon the ground. As well known to most users of posts, the difficulty with the ordinary farm-post is the rotting of the base in the ground, there being but two or three kinds of woods—such as locust, cedar, chestnut, and sassafras—which will resist the rotting action for any long period. The cheapest and most durable post is of course a wooden one, such post being necessary in making the ordinary wood fences, while it is preferable even with wire fences, as it is cheaper than the ordinary metal post and the wires can be more easily attached to it. The wire itself as well as the wood exposed above the ground are comparatively durable; but the great objection to the use of the wooden post is the rotting of the portion of the post within the ground, where it is directly exposed to the moisture contained therein.

The object of my invention is to provide a cheap post in which all fear of the rotting of the base is overcome and which has a large enough base to take a firm hold within the ground no matter what the size of the post-body may be.

It consists, generally stated, in the combination, with the fence-post body having one or more transverse grooves formed in the lower part thereof, of a hollow terra-cotta or other non-rotting or non-rusting base fitting around the same and a filling of asphaltum or other quick-setting material between the post-body and hollow base.

It also consists in certain other improvements, which will be hereinafter more particularly set forth and claimed.

To enable others skilled in the art to make and use my invention, I will describe the same more fully, referring to the accompanying drawings, in which—

Figure 1:
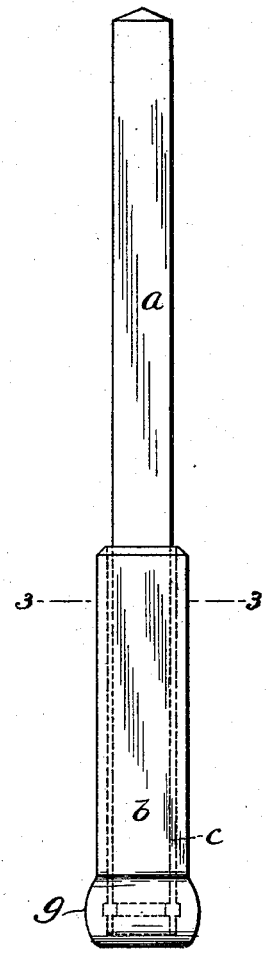
Figure 2:
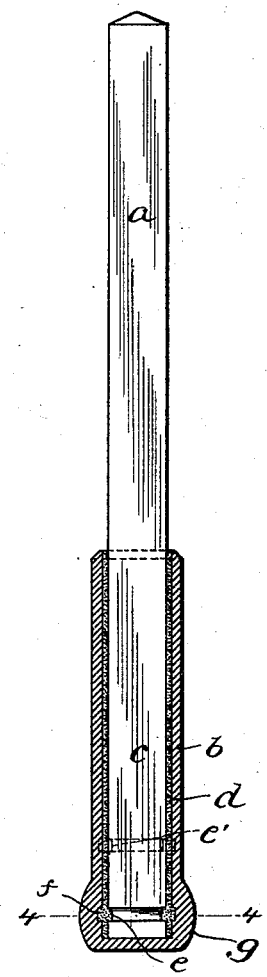
Figure 3:
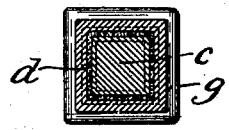
Figure 4:
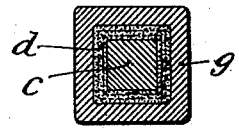

Figure 1 is a side view of the post embodying my invention. Fig. 2 is a longitudinal section of the same. Fig. 3 is a cross-section on the line 3 3, Fig. 1; and Fig. 4 is a cross-section on the line 4 4, Fig. 2.

The post-body $a$ may be formed of any suitable wood and may be of any suitable shape in cross-section. I have illustrated it as of square cross-section, that being the most desirable form, and I have illustrated it as of the same thickness throughout, though of course the post may be made of any shape, turned or ornamented as desired. Fitting around this post-body is the hollow base-piece $b$, which is preferably formed of terra-cotta molded to the desired shape and baked, because such terra-cotta forms can be quickly made, and such material probably forms the cheapest form of non-rotting material which could be employed. It is molded to shape in any suitable way and baked, after which it is slipped over the lower end $c$ of the post, and a suitable filling of asphaltum or other quick-setting material, as at $d$, is poured between the post-body and the base-piece and so unites the two together. In order to insure the anchoring of the post within the base-piece, any suitable anchoring means, such as an enlargement or depression in either post or base-piece, can be employed. The simplest form of anchor is obtained by forming a groove $e$ near the base of the post and in line with a groove $f$ within the hollow base-piece, so that the asphaltum may fit into these grooves and lock the post within the base-piece. One or more grooves may be employed, as desired, and it is not necessary for them to be on the same horizontal plane, an extra groove in the post-body being shown at $e'$ to illustrate this. Indeed, the hold of the asphaltum filling or setting upon the post-body and outer shell is generally sufficient to hold them together without necessity of any such anchoring means.

A wooden post of the above construction and made in the above way can be produced very cheaply, the whole structure, or, as it might be termed, "article of manufacture," costing less than the ordinary iron fence-post, and it is possible to ship the same as a regular article of manufacture from the place of manufacture to the place of use. In order to hold the post within the ground and enable it to resist the upward thrust encountered in the spring as the frost passes from the ground, I form around the body of the shell or base-piece an enlargement $g$, this enlargement being located at any suitable point in the shell below its upper end, so that it may be buried under the ground and so that the packing of ground above the same will hold the post down and resist the upward push of the frost upon the base of the post as it passes out of the ground.

While I prefer to employ the terra-cotta base-piece, both for lightness, comparative strength, and cheapness of cost, it is evident that any other suitable non-rotting hollow shell can be employed—for example, posts molded from cement or from asphaltum or other cheap substances which will be known to the skilled worker. The filling between the post and shell may also be changed as found desirable, any suitable properly-setting material, such as cements of different kinds, being employed to hold the shell upon the post. Where a metal post is used, I may employ the same hollow or shell base-piece and with practically the same advantage as to the protection of the post, preventing the post from rusting and so gradually disintegrating, it being found that such posts are very liable to be weakened by the rust, especially where they are made of wrought metal, as they are necessarily made of thin flanged bodies to obtain the desired cheapness of post.

What I claim as my invention, and desire to secure by Letters Patent, is—

The combination with a fence-post body having one or more transverse grooves in the lower part thereof, of a hollow non rotting or rusting base fitting around the same and having one or more interior grooves and a filling of setting material between the post-body and hollow base.

In testimony whereof I, the said RICHARD H. GEIGER, have hereunto set my hand.

RICHARD H. GEIGER.

Witnesses:
ROBT. D. TOTTEN,
ROBERT C. TOTTEN.